(12) United States Patent
Lin et al.

(10) Patent No.: US 12,480,787 B2
(45) Date of Patent: Nov. 25, 2025

(54) TOUCH SENSING SYSTEM, MULTI SENSOR DEVICE AND VEHICLE CONTROL DEVICE

(71) Applicant: PixArt Imaging Inc., Hsin-Chu (TW)

(72) Inventors: Yu-Sheng Lin, Hsin-Chu (TW); Chin-Hua Hu, Hsin-Chu (TW); Yu-Han Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 169 days.

(21) Appl. No.: 18/369,200

(22) Filed: Sep. 18, 2023

(65) Prior Publication Data

US 2024/0011802 A1 Jan. 11, 2024

Related U.S. Application Data

(63) Continuation-in-part of application No. 17/857,194, filed on Jul. 5, 2022, now Pat. No. 12,195,073.

(51) Int. Cl.
*G01D 5/241* (2006.01)
*B60R 16/03* (2006.01)
(Continued)

(52) U.S. Cl.
CPC ............ *G01D 5/241* (2013.01); *B60R 16/03* (2013.01); *G01R 27/2605* (2013.01); *H03K 17/962* (2013.01); *H03K 2217/96015* (2013.01)

(58) Field of Classification Search
CPC ........ G01R 27/00; G01R 27/02; G01R 27/26; G01R 27/2605; G01D 5/00; G01D 5/12; G01D 5/14; G01D 5/24; G01D 5/241; G06F 3/00; G06F 3/01; G06F 3/03; G06F 3/041; G06F 3/0416; G06F 3/04164; G06F 3/044; G06F 3/0043; H03K 17/00; H03K 17/94; H03K 17/96; H03K 17/962;
(Continued)

(56) References Cited

U.S. PATENT DOCUMENTS 9,552,118 B2 1/2017 Liao
9,746,980 B2 8/2017 Liao
(Continued)

FOREIGN PATENT DOCUMENTS

CN 101458133 6/2009
CN 102339179 2/2012
(Continued)

*Primary Examiner* — Hoai-An D. Nguyen
(74) *Attorney, Agent, or Firm* — Winston Hsu (57) ABSTRACT

A touch sensing system comprising: a frame work; an auxiliary layer, surrounding the frame work; a capacitive touch sensor layer, surrounding the auxiliary layer; a flexible material layer, located between the capacitive touch sensor layer and the auxiliary layer, and surrounding the auxiliary layer; and a flattening material layer, located between the capacitive touch sensor layer and the flexible material layer or located between the auxiliary layer and the flexible material layer, wherein the flattening material layer flattens the flexible material layer. The capacitive touch sensor layer comprises at least one first driving electrode and at least one first sensing electrode. The auxiliary layer comprises at least one electrode. Similar structure can also be used to a multi-sensor device and a vehicle control device. By this way, the assembling or the manufacturing can be simplified.

18 Claims, 12 Drawing Sheets

(51) Int. Cl.
*G01R 27/26* (2006.01)
*H03K 17/96* (2006.01)

(58) Field of Classification Search
CPC .......... H03K 2217/00; H03K 2217/94; H03K 2217/96; H03K 2217/90615; B62D 1/00; B62D 1/02; B62D 1/04; B62D 1/046; B62D 1/06; B60R 16/00; B60R 16/02; B60R 16/03
USPC ................................ 324/600, 649, 658, 686
See application file for complete search history.

(56) References Cited

U.S. PATENT DOCUMENTS

| | | | |
|---|---|---|---|
| 10,114,513 B2 | 10/2018 | Staszak | |
| 10,370,019 B2 | 8/2019 | Michelmann | |
| 10,698,544 B2 | 6/2020 | Staszak | |
| 10,953,908 B1 | 3/2021 | Ahn | |
| 11,029,438 B2 | 6/2021 | Takamatsu | |
| 11,032,875 B2 | 6/2021 | Lisseman | |
| 11,299,191 B2 | 4/2022 | Van'tzelfde | |
| 11,565,738 B2 | 1/2023 | Zoppas | |
| 11,599,226 B2 | 3/2023 | Staszak | |
| 12,043,268 B2 | 7/2024 | Fields | |
| 12,086,583 B2 | 9/2024 | Fields | |
| 2010/0211270 A1 | 8/2010 | Chin | |
| 2013/0126325 A1 | 5/2013 | Curtis | |
| 2013/0234977 A1 | 9/2013 | Lin | |
| 2014/0156107 A1 | 6/2014 | Karasawa | |
| 2015/0369633 A1 | 12/2015 | Karasawa | |
| 2017/0146801 A1 | 5/2017 | Stempora | |
| 2019/0094967 A1 | 3/2019 | Bisbee | |
| 2019/0317641 A1 | 10/2019 | Maruyama | |
| 2019/0339412 A1 | 11/2019 | Takamatsu | |
| 2020/0150826 A1 | 5/2020 | Hwang | |
| 2021/0152175 A1 | 5/2021 | Buttolo | |
| 2021/0206418 A1 | 7/2021 | Nakano | |
| 2021/0362767 A1 | 11/2021 | Minoshima | |
| 2022/0048552 A1 | 2/2022 | Salter | |
| 2022/0073122 A1 | 3/2022 | Salter | |
| 2022/0382508 A1* | 12/2022 | Viscusi | G06F 3/165 |
| 2023/0351893 A1 | 11/2023 | Bielby | |

FOREIGN PATENT DOCUMENTS

| | | | | |
|---|---|---|---|---|
| CN | 102043554 B | * | 12/2013 | ............ G06F 3/044 |
| CN | 105474145 A | * | 4/2016 | ........... G06F 3/0445 |
| CN | 105988635 A | | 10/2016 | |
| CN | 207232925 U | * | 4/2018 | ............ G06F 3/044 |
| CN | 207731256 U | * | 8/2018 | ............ G06F 3/044 |
| DE | 10 2012 019 625 A1 | | 4/2013 | |
| JP | 2018022286 A | * | 2/2018 | ........... G06F 3/0412 |

* cited by examiner

TOUCH SENSING SYSTEM, MULTI SENSOR DEVICE AND VEHICLE CONTROL DEVICE

CROSS REFERENCE TO RELATED APPLICATIONS

This application is a continuation-in-part of U.S. application Ser. No. 17/857,194, filed on Jul. 5, 2022. The content of the application is incorporated herein by reference.

BACKGROUND OF THE INVENTION

1. Field of the Invention

The present invention relates to a touch sensing system, a multi sensor device and a vehicle control device, and particularly relates to a touch sensing system, a multi sensor device and a vehicle control device which uses a flexible material layer such that assembling or manufacturing thereof can be simplified.

2. Description of the Prior Art

A conventional steering wheel may have a HOD (Hand Off Detection) function, which can prevent the driver from falling asleep while driving or help assist the driver in autopilot. The sensor in a touch sensing device of the steering wheel is always provided on non-flexible material such as conductive fabric. However, in such structure, it is hard to assemble or manufacture the touch sensing device to fit the steering wheel, since the touch sensing device has a poor flexibility.

SUMMARY OF THE INVENTION

One objective of the present invention is to provide a touch sensing system which can more easily fit a size and a shape of a vehicle control device.

Another objective of the present invention is to provide a multi sensor device which can more easily fit a size and a shape of a vehicle control device.

Still another objective of the present invention is to provide a vehicle control device which has a simplified assembling process.

One embodiment of the present invention discloses a touch sensing system comprising: a frame work; an auxiliary layer, surrounding the frame work; a capacitive touch sensor layer, surrounding the auxiliary layer; a flexible material layer, located between the capacitive touch sensor layer and the auxiliary layer, and surrounding the auxiliary layer; and a flattening material layer, located between the capacitive touch sensor layer and the flexible material layer or located between the auxiliary layer and the flexible material layer, wherein the flattening material layer flattens the flexible material layer. The capacitive touch sensor layer is above the flexible material layer when the auxiliary layer is below the flexible material layer. The capacitive touch sensor layer comprises at least one first driving electrode and at least one first sensing electrode. The auxiliary layer comprises at least one electrode.

Another embodiment of the present invention discloses a multi sensor device, comprising: a frame work; a first sensor layer, surrounding the frame work; a second sensor layer, surrounding the first sensor layer; a flexible material layer, located between the first sensor layer and the second sensor layer, and surrounding the first sensor layer; and a flattening material layer, located between the second sensor layer and the flexible material layer or located between the first sensor layer and the flexible material layer, wherein the flattening material layer flattens the flexible material layer. The second sensor layer is above the flexible material layer when the first sensor layer is below the flexible material layer. The first sensor layer has at least one first driving electrode and at least one first sensing electrode. The second sensor layer comprises at least one second driving electrode and at least one second sensing electrode.

Another embodiment of the present invention discloses a vehicle control device, comprising: a frame work; a heating layer, surrounding the frame work; a first layer, surrounding the heating layer; a flexible material layer, located between the heating layer and the first layer, and surrounding the heating layer; and a flattening material layer, located between the first layer and flexible material layer or between the heating layer and the flexible material layer, wherein the flattening material layer fills at least one aperture or at least one crack of the flexible material layer. The first layer is above the flexible material layer when the heating layer is below the flexible material layer. The first layer comprises at least one first electrode. The heating layer has at least one heating electrode.

In view of above-mentioned embodiments, the touch sensing device can fit the size or the shape of the steering wheel more easily, since the sensor layer is provided to the flexible material layer. Additionally, the noise generated by the heating circuit can be reduced since a driving circuit of the heating circuit does not turn on and turn off a switch to generate the driving current.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. In following embodiments, the terms "first", "second", "third" in descriptions are only for the purpose of distinguishing different one elements, and do not mean the sequence of the elements. For example, a first device and a second device only mean these devices can have the same structure but are different devices. Also, in following embodiments, a steering wheel is used as an example for explaining the concepts of the present invention. However, the concepts of the present invention can be implemented to any other vehicle control device of a vehicle. Further, the vehicle in following embodiments is a car, but not limited.

Figure 1:
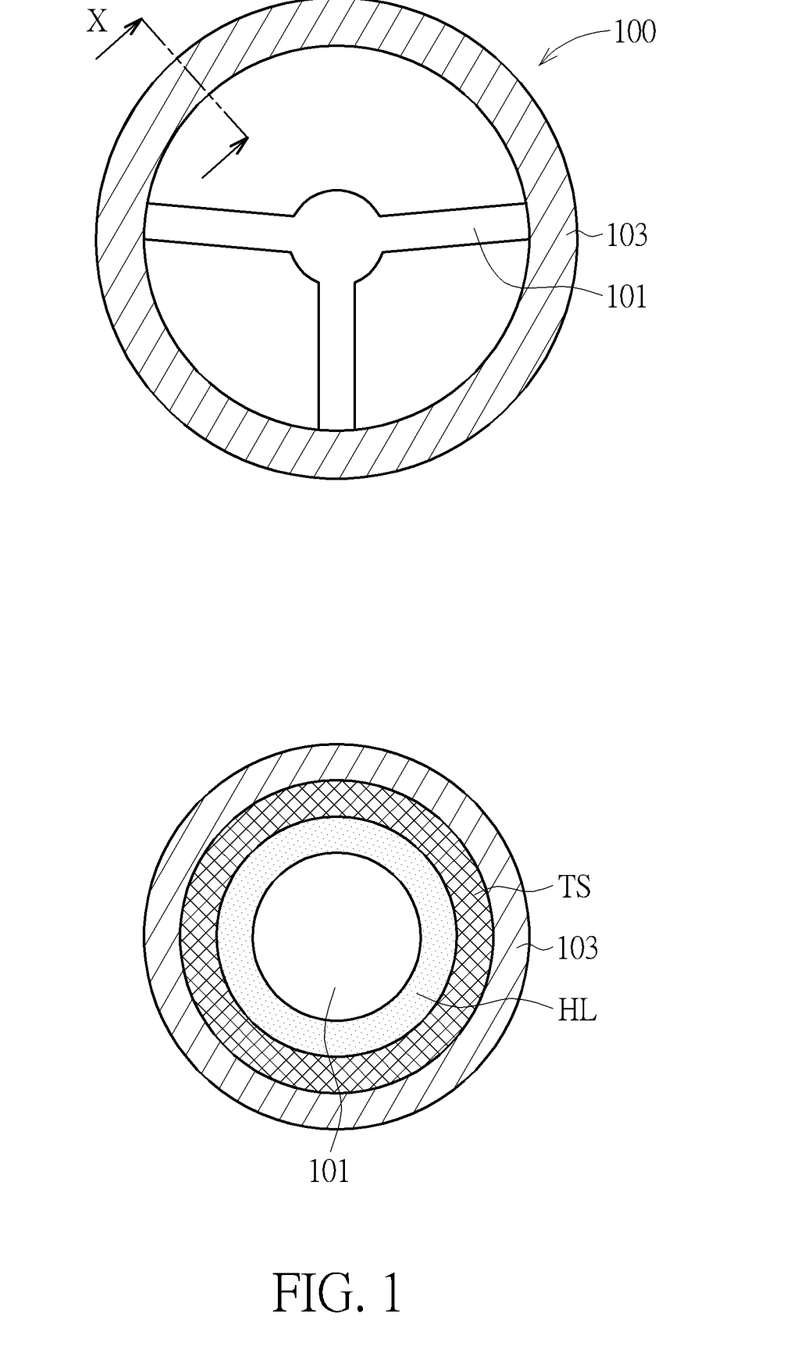
FIG. 1 is a schematic diagram illustrating a steering wheel 100 according to one embodiment of the present invention.

FIG. 1 is a schematic diagram illustrating a steering wheel 100 according to one embodiment of the present invention. The lower diagram in FIG. 1 is a cross sectional view following an X direction of the upper diagram in FIG. 1. As illustrated in the upper diagram of FIG. 1, the steering wheel 100 comprises a frame work 101 and a covering material 103. The covering material 103, which can be leather or plastic, is the outermost layer of the steering wheel 100.

As shown in the lower diagram of FIG. 1, besides the framework 101 and the covering material 103, the steering wheel 100 further comprises a touch sensing device TS and a heating layer HL. The heating layer HL is surrounding the frame work 101. The touch sensing device TS is surrounding the frame work 101 and the heating layer HL, and is configured to sense touch provided by the user. For example, the touch sensing device TS senses the touch provided by a hand of the user. In such embodiment, the steering wheel 100 can be regarded as a touch sensing system which can be used as an HOD device. Please note the touch mentioned here may mean direct touch or indirect touch. The direct touch means the steering wheel 100 is really touched by the user. Also, the indirect touch means the user does not really touch the steering wheel 100 but is very close to steering wheel 100. Further, in one embodiment, if the user touches the steering wheel 100, it means the user touches the covering material 103.

Figure 2:
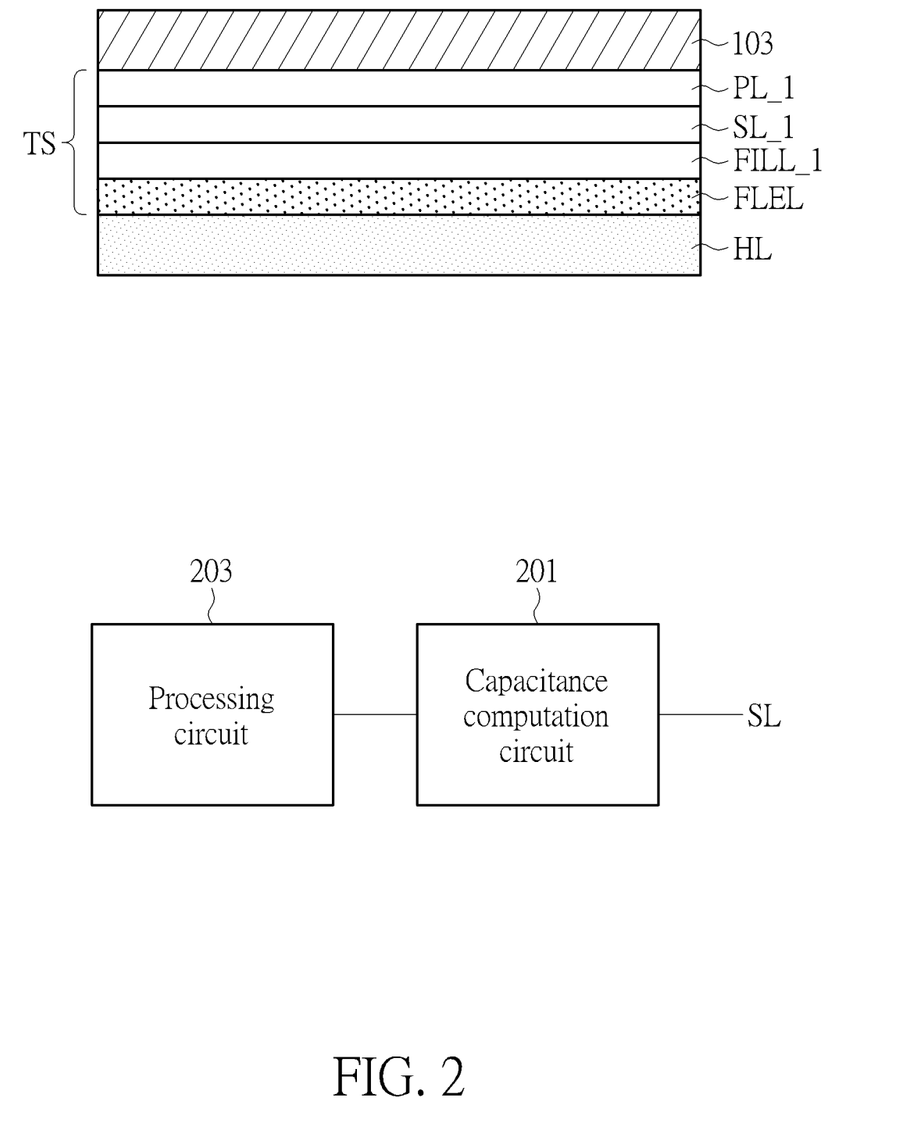
FIG. 2 is a schematic diagram illustrating detail structures of the touch sensing device illustrated in FIG. 1.

The touch sensing device TS may have various structures. FIG. 2 is a schematic diagram illustrating detail structures of the touch sensing device illustrated in FIG. 1. As illustrated in the upper diagram of FIG. 2, the touch sensing device TS comprises a non-conductive layer PL_1, a first sensor layer SL_1, a flattening material layer FILL_1 and a flexible material layer FLEL. In the embodiment of FIG. 2, the non-conductive layer PL_1 touches the covering material 103, and the flexible material layer FLEL touches the heating layer HL. The relations between each layer can be acquired by referring to FIG. 1 and FIG. 2, thus descriptions thereof are omitted for brevity here. Please note, the structure illustrated in FIG. 2 and following FIG. 4 may be used in a device other than the touch sensing device TS. In such embodiment, the first sensor layer SL_1 is a first layer which is not used for sensing touch provided by the user.

The non-conductive layer PL_1 is configured to protect other layers of the touch sensing device TS. In one embodiment, the non-conductive layer is made of insulating ink or protective ink. However, the non-conductive layer PL_1 may be removed in another embodiment. Also, in the embodiment of FIG. 2, the first sensor layer SL_1 is a capacitive touch sensor layer which comprises at least one first driving electrode and at least one first sensing electrode. The first driving electrode and the first sensing electrode may be the same electrode or different electrodes. In one embodiment, the first driving electrode and the first sensing electrode are made of conductive silver paste or printed by conductive ink. Besides, in one embodiment, the flexible material layer FLEL is made of elastic woven or Silicone. The elastic woven or Silicone is more flexible than the conductive fabric used in a conventional touch sensing device, thus can more easily fit the size or the shape of the framework 101. The flattening material layer FILL_1 is configured to flatten the flexible material layer FLEL. In one embodiment, the flattening material layer FILL_1 is configured to fill at least one aperture or at least one crack of the flexible material layer FLEX. In such embodiment, the flattening material layer FILL_1 may be made of Polyurethane. However, if the flexible material layer FLEX is made of material which has no crack and aperture or only a few of cracks and apertures, the flattening material layer FILL_1 can be removed. In another embodiment, the flattening material layer FILL_1 is an independent layer glued to the flexible material layer FLEX to flatten the flexible material layer FLEX, rather than fill the aperture or the crack of the flexible material layer FLEX.

As above-mentioned, the first sensor layer SL_1 may be a capacitive touch sensor layer which comprises at least one first driving electrode and at least one first sensing electrode. In one embodiment, the touch sensing device TS further comprises a capacitance computation circuit 201, and the vehicle using the steering wheel 100 comprises a processing circuit 203, as shown in FIG. 2. The capacitance computation circuit 201 generates driving signals to the first driving electrode of the first sensor layer SL_1 and senses capacitance information from/through the first sensing electrode (i.e., the touch sensing signal). The processing circuit 203 may generate a control command according to the touch sensing signals. The control command maybe used for controlling a device of the vehicle using the steering wheel 100. The capacitance of the first sensing electrodes changes if the user touches the steering wheel 100. Accordingly, the processing circuit 203 is configured to generate the control command according to whether the steering wheel 100 is touched or not. If the touch sensing device TS is used for HOD function, the processing circuit 203 may generate the control command to active an alarm if the user's hand does not touch the steering wheel 100 for a predetermined time period while the vehicle is moving.

Figure 3:
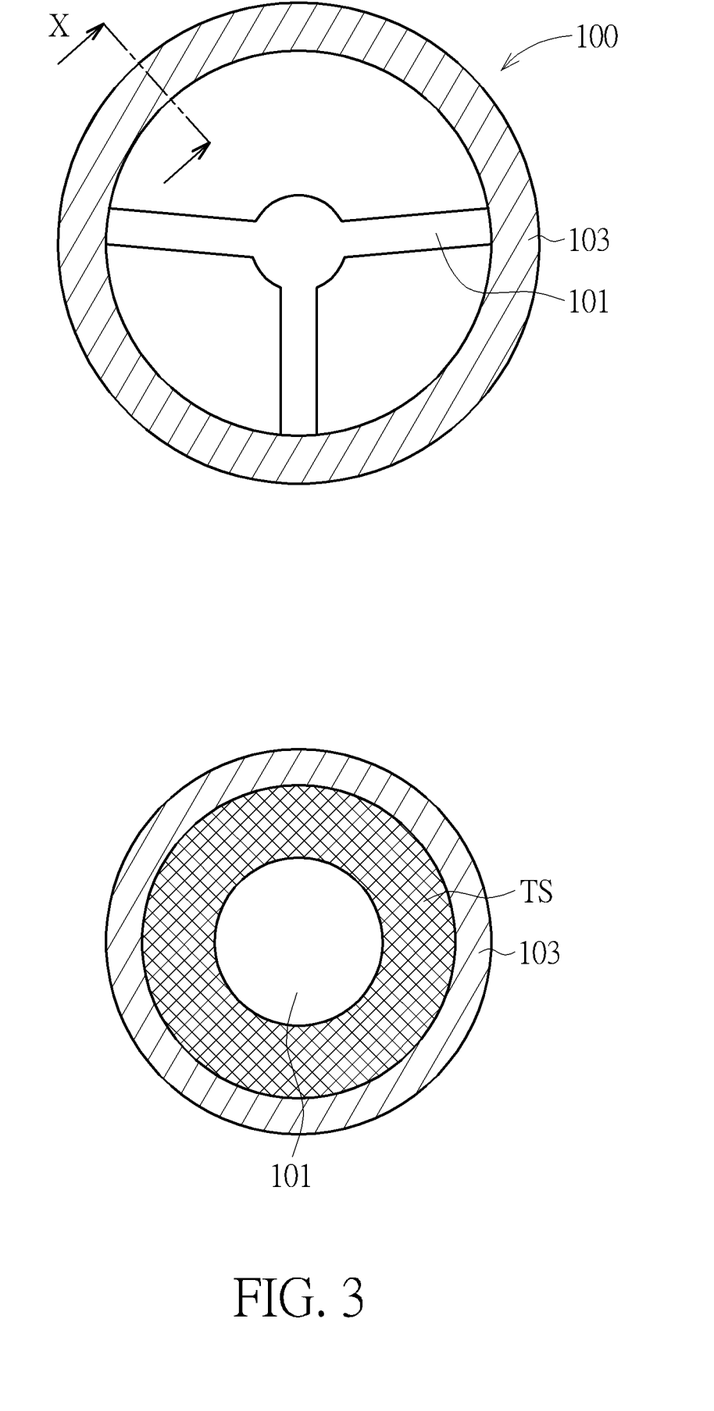
FIG. 3 is a schematic diagram illustrating a vehicle control device according to one embodiment of the present invention.

The structure of the touch sensing device TS is not limited to the structure illustrated in FIG. 1 and FIG. 2. FIG. 3 is a schematic diagram illustrating a vehicle control device according to one embodiment of the present invention. In the embodiment of FIG. 3, the heating layer HL is integrated to the touch sensing device TS, thus is not shown in FIG. 3.

Figure 4:
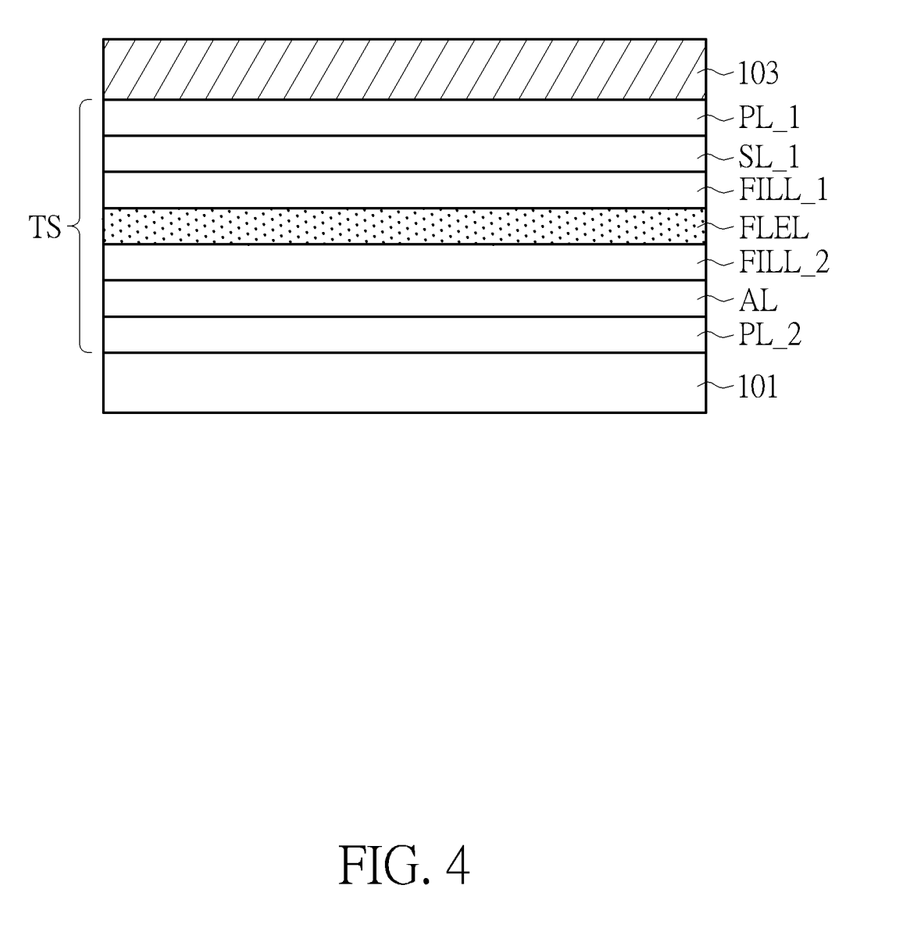
FIG. 4 is a schematic diagram illustrating detail structures of the touch sensing device illustrated in FIG. 3.

Please refer to FIG. 4, which is a schematic diagram illustrating detail structures of the touch sensing device illustrated in FIG. 3. Besides the non-conductive layer PL_1, the first sensor layer SL_1, the flattening material layer FILL_1 and the flexible material layer FLEL shown in FIG. 2, the touch sensing device TS in FIG. 4 further comprises a non-conductive layer PL_2, an auxiliary layer AL, and a flattening material layer FILL_2. In such structure, the auxiliary layer AL is surrounding the frame work 101. The flexible material layer FLEL is located between the first sensor layer SL_1 and the auxiliary layer AL, and surrounding the auxiliary layer AL. The flattening material layer FILL_2 is located between the auxiliary layer AL and the flexible material layer FLEL. Further, the first sensor layer SL_1 is above the flexible material layer FLEL when the auxiliary layer AL is below the flexible material layer FLEL. In other words, the first sensor layer SL_1 and the auxiliary layer AL face opposite sides of the flexible material layer FLEL.

Details of the non-conductive layer PL_1, the first sensor layer SL_1, the flattening material layer FILL_1 and the flexible material layer FLEL are illustrated in the embodiment of FIG. 1. Moreover, the non-conductive layer PL_2 and the flattening material layer FILL_2 may have the same characteristics of the non-conductive layer PL_1 and the flattening material layer FILL_1. Accordingly, descriptions thereof are omitted for brevity here.

In one embodiment, the auxiliary layer AL comprises a ground layer or a heating layer. In one embodiment, the auxiliary layer AL simultaneously has the functions of the ground layer and the heating layer. In such case, the heating layer may operate according to a DC value of a received signal and the ground layer may operates according to an AC value of the received signal. In such case, the auxiliary layer AL may comprise at least one electrode which is made of Graphene. The temperature stability of Graphene is higher than the temperature stability of the conductive silver paste, which is used to make the first sensor layer SL_1. Accordingly, the electrodes of the auxiliary layer AL may serve as the heating layer or serves as the ground layer which is close to the heating layer. In one embodiment, the ground layer is coupled to a predetermined voltage level, to operate as an active shielding layer for the first sensor layer SL_1. In one embodiment, the predetermined voltage level is a ground voltage level of the whole vehicle using the steering wheel 100. Additionally, in one embodiment, the predetermined voltage level is adjustable. For example, the predetermined voltage level may be manually adjusted. For another example, the predetermined voltage level may be automatically adjusted according to signal noise amplitudes or signal periods of signals detected by a sensor.

In one embodiment, the auxiliary layer AL is replaced with a second sensor layer which comprises at least one second driving electrode and at least one second sensing electrode. The second driving electrode and the second sensing electrode may be the same electrode or different electrodes. For example, the second sensor layer can be a capacitive pressure sensor layer. In such case, the steering wheel 100 not only can sense the touch of the user but also can sense a pressure provided by the user. Details of the pressure sensing is described in a related patent application with an application Ser. No. 17/857,194, thus descriptions thereof are omitted for brevity here. In such case, the steering wheel 100 can be regarded as a multi sensor device.

Figure 5:
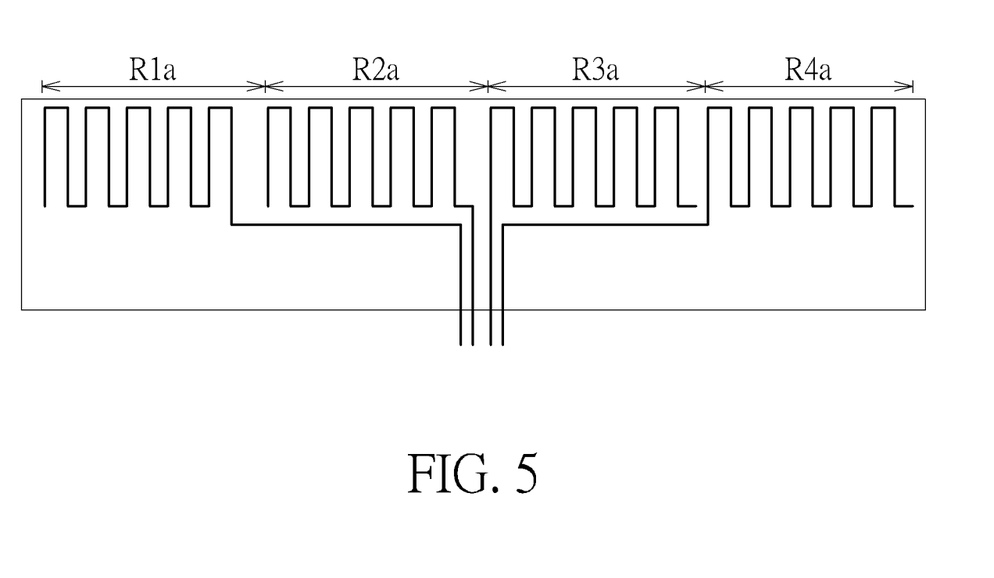
FIG. 5 and FIG. 6 are schematic diagrams illustrating the configurations of the electrodes of the sensor layer or the auxiliary layer, according to different embodiments of the present invention.
Figure 6:
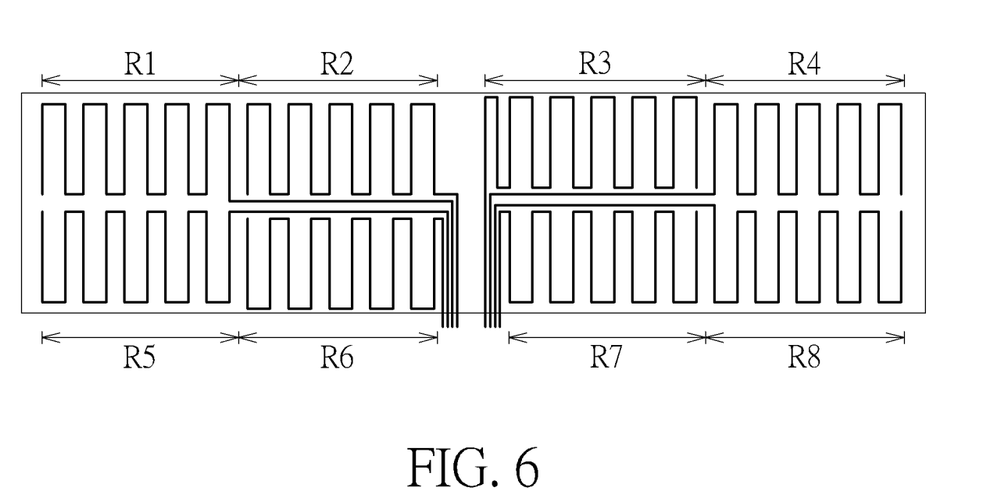

The configurations of electrodes, such as the first sensing electrode, the first driving electrode, the second sensing electrode, and the second driving electrode in above-mentioned embodiments can be changed corresponding to different requirements. FIG. 5 and FIG. 6 are schematic diagrams illustrating the configurations of the electrodes of the first sensor layer or the second sensor layer, according to different embodiments of the present invention. The electrodes in the embodiments of FIG. 5 and FIG. 6 are both self-capacitance structures. In such case, the above-mentioned first driving electrode and the first sensing electrode are the same electrode, and the above-mentioned second driving electrode and the second sensing electrode are the same electrode. Also, the electrodes in the embodiment of FIG. 5 are classified into four electrode regions R1a, R2a, R3a and R4a. Besides, the electrodes in the embodiment of FIG. 6 are classified into eight electrode regions R1, R2, R3, R4, R5, R6, R7 and R8. Via the plurality of electrode regions, the movement of the user's hand on the steering wheel 100 can be sensed. Please note, the configurations of the electrodes are not limited to the embodiments illustrated in FIG. 5 and FIG. 6. The above-mentioned electrode regions R1a, R2a, R3a, R4a, R1, R2, R3, R4, R5 can also be regarded as sensing regions. The structure of the electrodes of the auxiliary layer AL can be the same as or different the structure illustrated in FIG. 5 and FIG. 6.

Besides the self-capacitance structure illustrated in FIG. 5 and FIG. 6, the electrodes of the first sensor layer and the second sensor layer can also have mutual capacitance structure. In such case, the above-mentioned first driving electrode and the first sensing electrode are different electrodes, and the above-mentioned second driving electrode and the second sensing electrode are different electrodes. Details about the self-capacitance structure and the mutual capacitance structure are well known by persons skilled in the art. For example, a US patent with a patent number of U.S. Pat. No. 9,684,418 clearly states the structures the self-capacitance structure and the mutual capacitance structure, thus descriptions thereof are omitted for brevity here.

Figure 7:
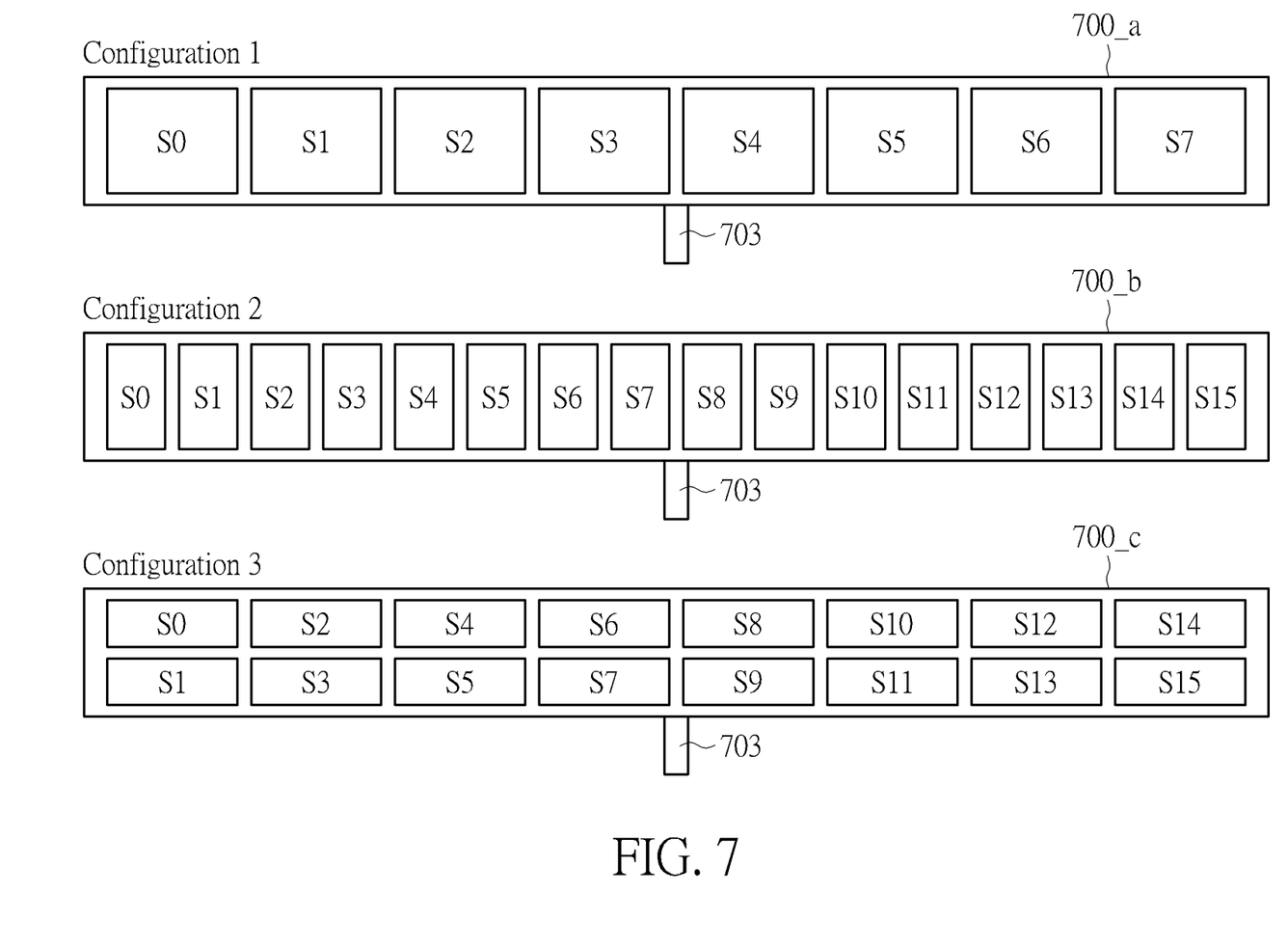
FIG. 7 is a schematic diagram illustrating the sensing regions illustrated in FIG. 5 and FIG. 6, according to one embodiment of the present invention.

FIG. 7 is a schematic diagram illustrating the sensing regions illustrated in FIG. 5 and FIG. 6, according to one embodiment of the present invention. As illustrated in FIG. 7, in the Configuration 1 and the Configuration 2, the sensor mat 700_a and 700_b respectively comprises sensing regions S1-S7 and sensing regions S1-S15, which are arranged in a single line. Also, in the Configuration 3, the sensor mat 700_c comprises sensing regions S1-S15, which are arranged in two lines. Besides the sensing regions, the sensor mats 700_a, 700_b and 700_c in FIG. 7 further respectively comprises a collection portion 703, which is configured to collect signal lines for electrodes in the sensing regions. The sensing regions illustrated in FIG. 7 can be used for touch sensing or pressure sensing. If the sensing regions are all applied for touch sensing, the sensor mat is the above-mentioned capacitive touch sensor layer. For example, if the sensing regions S1-S7 of the sensor mat 700_a are all applied for touch sensing, the sensor mat 700_a is the above-mentioned capacitive touch sensor layer. Following the same rule, if the sensing regions S1-S15 of the sensor mat 700_b are all applied for pressure sensing, the sensor mat 700_b is the above-mentioned capacitive pressure sensor layer. Also, if some sensing regions in a single sensor mat are applied for touch sensing and other sensing regions in the same sensor mat are applied for pressure sensing, the sensor mat is a combination layer which can be used for touch sensing and pressure sensing. For example, if the sensing regions S0, S2, S4, S6, S8, S10, S12, S14 of the sensor mat 700_c are applied for touch sensing and the sensing regions S1, S3, S5, S7, S9, S11, S13, S15 of the sensor mat 700_c are applied for pressure sensing, the sensor mat 700_c is the above-mentioned combination layer CL. It will be appreciated that the configuration of sensing regions are not limited to the embodiments illustrated in FIG. 7. The configurations of sensing regions can be set corresponding to different requirements. For example, the sensing regions can be set corresponding to the size of the steering wheel or the manufacturing process of the sensor mat.

Figure 8:
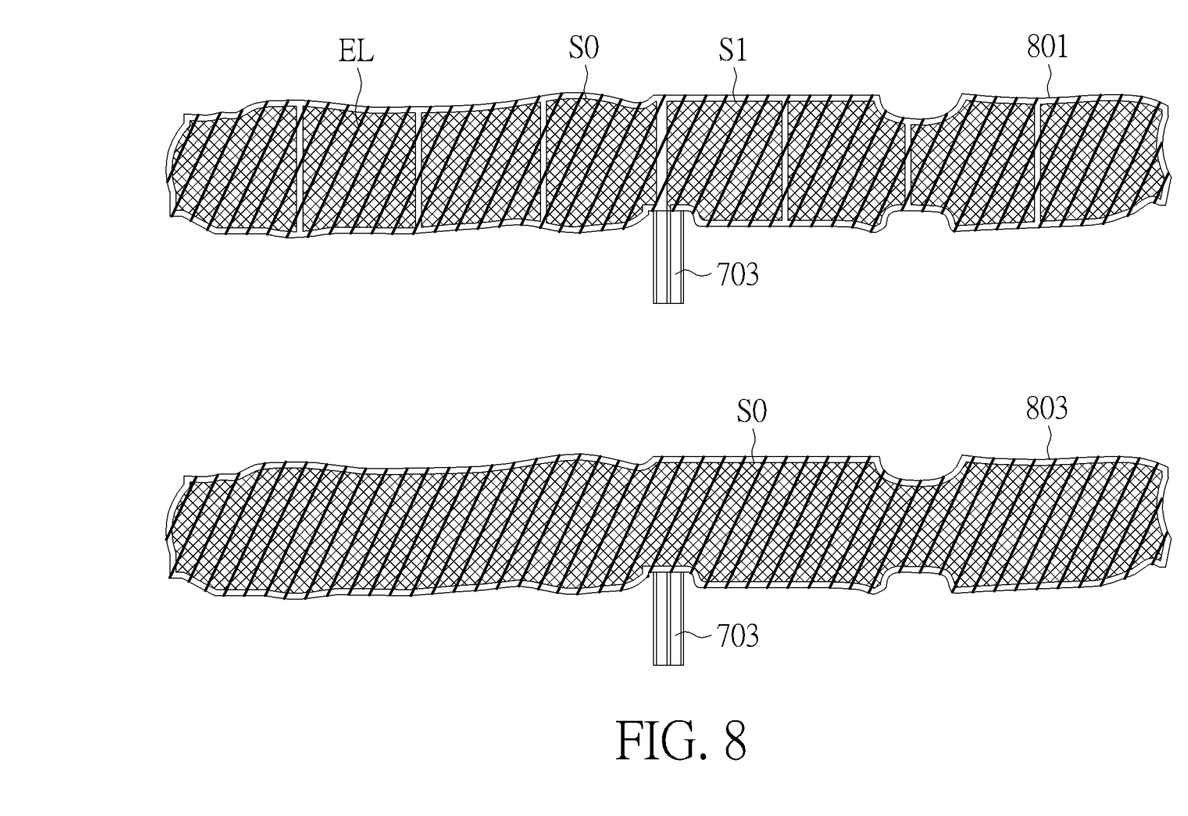
FIG. 8 is a schematic diagram illustrating practical examples of a sensor mat which comprises the sensing regions and electrodes illustrated in FIG. 5 and FIG. 6, according to one embodiment of the present invention.

FIG. 8 is a schematic diagram illustrating practical examples of a sensor mat which comprises the sensing regions and electrodes illustrated in FIG. 5 and FIG. 6, according to one embodiment of the present invention. In FIG. 8, the sensor mat 801 comprises a plurality of sensing regions (only two sensing regions S0, S1 are symbolized), and each one of the sensing regions comprises the above-mentioned electrodes EL. Also, the sensor mat 803 comprises only one sensing region S0.

In one embodiment, the capacitance computation circuit 201 is implemented by a touch sensing IC, which can be coupled (i.e., electrically connected) to the first sensing electrodes and the first driving electrodes via the collection portion 703 in FIG. 8. However, the connections between the first sensing electrodes, the first driving electrodes and the touch sensing IC is not limited to such structure.

Figure 9:
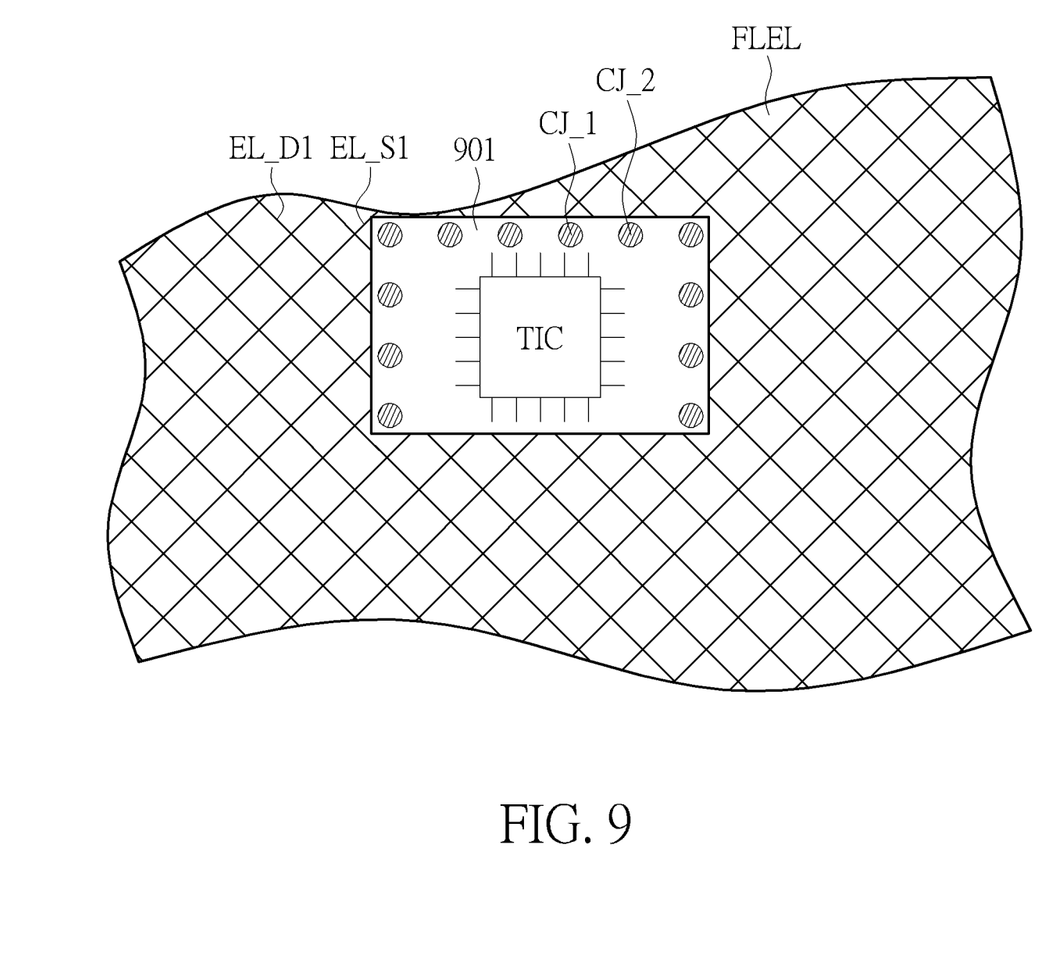
FIG. 9, FIG. 10 and FIG. 11 are schematic diagrams illustrating the structures for fixing a touch sensing IC to the sensor layer, according to different embodiments of the present invention.
Figure 10:
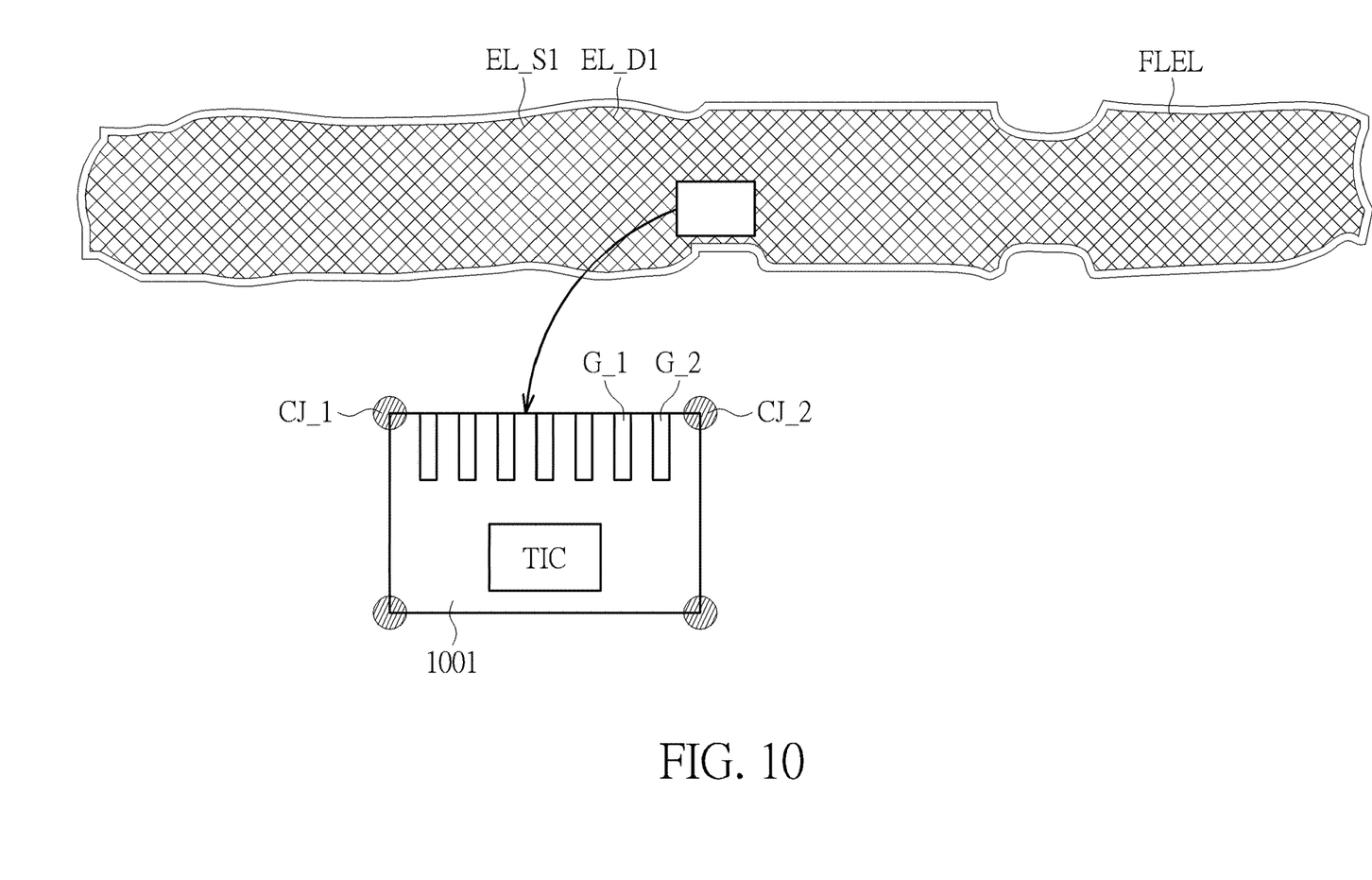
Figure 11:
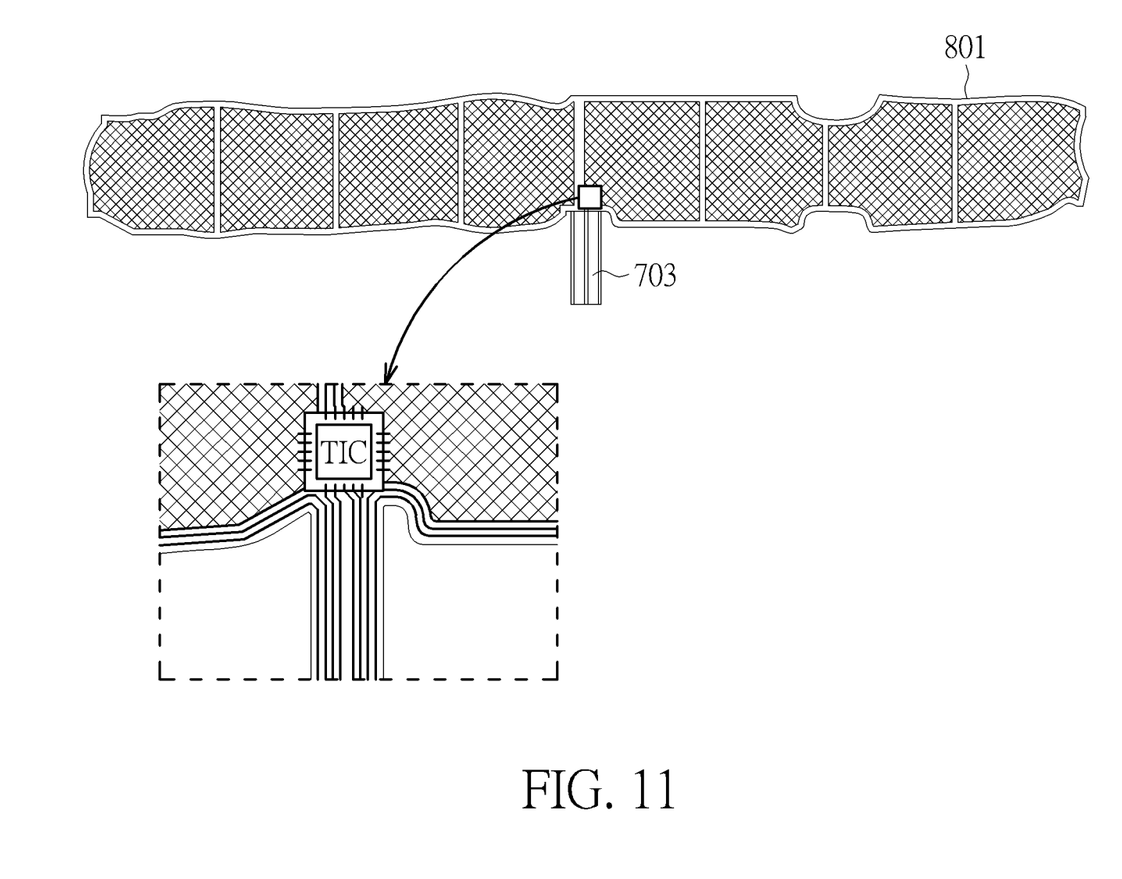

FIG. 9, FIG. 10 and FIG. 11 are schematic diagrams illustrating the structures for fixing a touch sensing IC to the sensor layer or the flexible material layer, according to different embodiments of the present invention. In the embodiments of FIG. 9, a touch sensing IC TIC is provided to couple the first driving electrode EL_d1 and the first sensing electrode EL_s1 (only one driving electrode and one sensing electrode are symbolized for explaining). Also, a substrate 901 is located between the touch sensing IC TIC and the flexible material layer FLEL. In other words, the substrate 901 is located between the touch sensing IC TIC and the first sensor layer SL_1. In one embodiment, the touch sensing IC TIC is provided to the substrate 901 first, and then coupled the first driving electrode EL_d1 and the first sensing electrode EL_s1 via the substrate 901.

Besides, at least one conjunction component (only two conjunction components CJ_1, CJ_2 are symbolized for explaining) is provided, to pass through the substrate 901 and to fasten the substrate 901 to the flexible material layer FLEL. By this way, it does not need to collect signal lines of the first driving electrode EL_d1 and the first sensing electrode EL_s1 by the collection portion 703. The assembling of the touch sensing device TS and the flexible material layer FLEL, or of the touch sensing device TS and the first sensor layer can be simplified.

In one embodiment, the conjunction components CJ_1, CJ_2 are rivets and the substrate 901 is a FPC (flexure circuit board). In such case, conductive lines or conductive material can be provided to couple the touch sensing IC TIC and the first driving electrode EL_d1 and the first sensing electrode EL_s1 through the conjunction components CJ_1, CJ_2. However, the conjunction components CJ_1, CJ_2 and the substrate 901 are not limited to such example.

In another embodiment, the substrate 901 is a golden finger PCB 1001, as shown in FIG. 10. In such case, the golden finger PCB 1001 may be agglutinated to the first sensor layer SL_1 or the flexible material layer FLEE and fixed by the conjunction components CJ_1, CJ_2. Also, the first driving electrode EL_d1 and the first sensing electrode EL_s1 may couple the golden fingers (only two golden fingers G_1, G_2 are symbolized for explaining). Besides, the touch sensing IC may be provided to the golden finger PCB 1001 and couples to the golden fingers G_1, G_2 via welding or hot bar.

For the embodiments of FIG. 9 and FIG. 10, other materials can be used to strengthen the joint between the touch sensing IC and the first sensor layer SL_1 or between the touch sensing IC and the flexible material layer FLEL. For example, UV light curing resin or epoxy adhesive can be provided between the substrate 901 and the first sensor layer SL_1, or between the substrate 901 and the flexible material layer FLEL, to strengthen the joint between the touch sensing IC and the first sensor layer or between the touch sensing IC and the flexible material layer FLEL.

Figure 12:
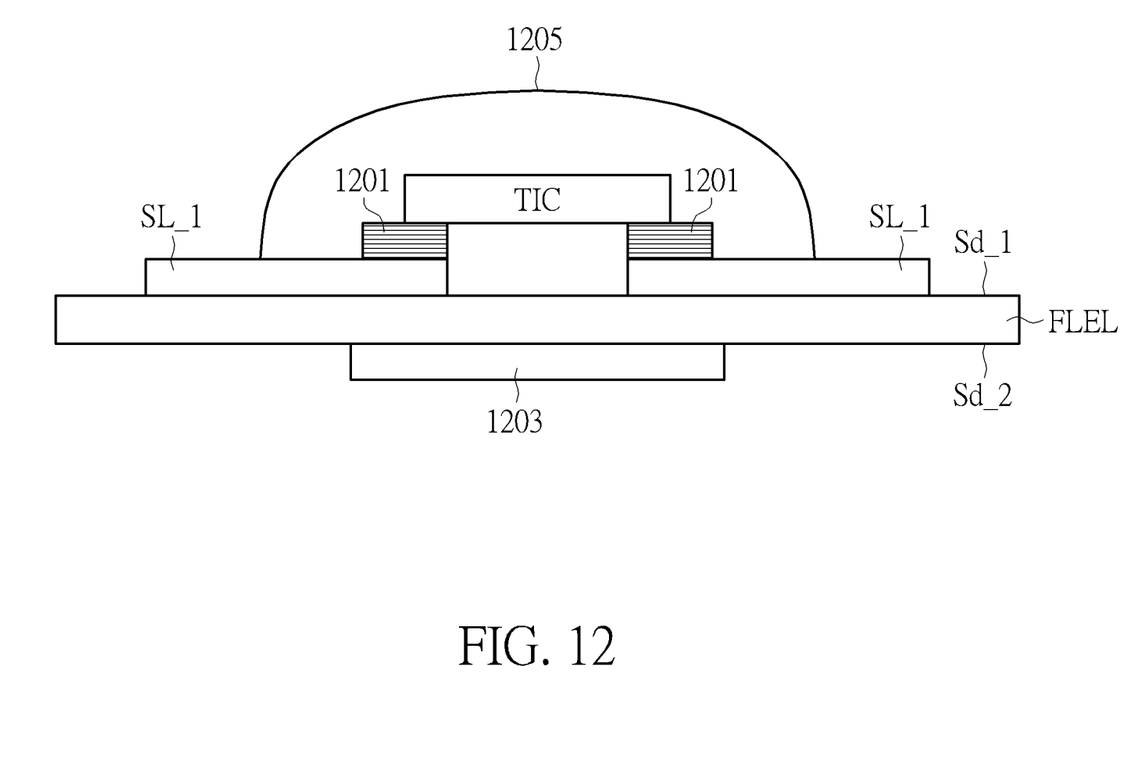
FIG. 12 is a cross-sectional view of the structure illustrated in FIG. 11.

In one embodiment, the touch sensing IC TIC is welded to face a first side of the flexible material layer. In such case, a supporting layer, which is configured to support the touch sensing IC TIC, is provided to face a second side of the flexible material layer. Such embodiment is illustrated in FIG. 11 and FIG. 12. In FIG. 11, the sensor mat 801 is used as an example for explaining. Also, FIG. 12 is a cross-sectional view of the structure illustrated in FIG. 11. Please also refer to FIG. 12 while referring to FIG. 11, to understand the concepts of the present invention for more clarity.

As shown in FIG. 11 and FIG. 12, the touch sensing IC TIC is provided on the first sensor layer SL_1 via a welding layer 1201, to face a first side Sd_1 of the flexible material layer FLEL. Also, a supporting layer 1203 is provided to a second side of the flexible material layer FLEL. Please note, if the above-mentioned flattening material layer FILL_1 is provided between the supporting layer 1203 and the flexible material layer FLEL, the supporting layer 1203 is provided to the flattening material layer FILL_1 to face a second side of the flexible material layer FLEL. Additionally, if the structure illustrated in FIG. 11 and FIG. 12 has the structure illustrated in FIG. 4, the supporting layer 1203 may be located between the flattening material layer FILL_2 and the flexible material layer FLEL. In one embodiment, a covering 1205 may be provided to protect the touch sensing IC TIC and the welding layer 1201. The covering 1205 may vinyl or any other material which can provide protection.

In the embodiments of FIG. 9, FIG. 10, FIG. 11 and FIG. 12, the capacitive touch sensor layer is used as an example for explaining. However, an IC for the capacitive pressure sensing layer (the second sensor layer) or for the auxiliary layer AL can also use the structures in FIG. 9, FIG. 10, FIG. 11 and FIG. 12. Additionally, in the embodiments of FIG. 9, FIG. 10, FIG. 11 and FIG. 12, the touch sensing IC may be provided to the flexible material layer FLEL. However, if the flexible material layer FLEL is covered by the flattening material layer FILL_1 or FILL_2, the description "the touch sensing IC is provided to the flexible material layer FLEL" may mean "the touch sensing IC is provided to the flattening material layer FILL_1 or FILL_2"

As above-mentioned, the auxiliary layer AL in FIG. 4 may comprise a heating layer. In such case, the heating layer may further comprise a heating circuit for heating the steering wheel 100. However, a conventional heating always uses a PWM signal to turn on and turn off switches. In such case, the turn on/turn off of the switches may causes noises, which may affect the accuracy of touch sensing or pressure sensing. Accordingly, the present invention further provides a heating circuit which generates less noise.

Figure 13:
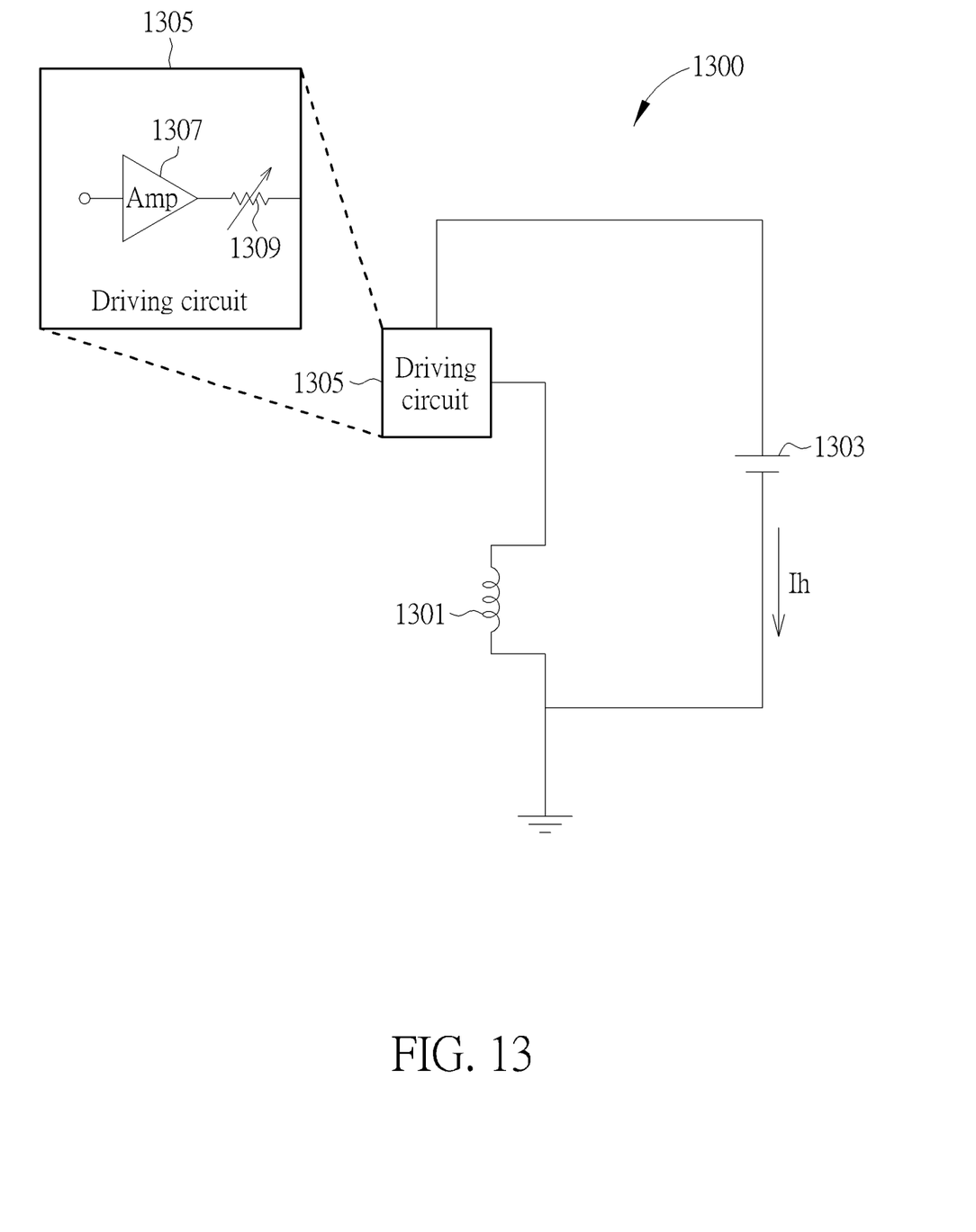
FIG. 13 is a circuit diagram illustrating a heating circuit according to one embodiment of the present invention.

FIG. 13 is a circuit diagram illustrating a heating circuit 1300 according to one embodiment of the present invention. As shown in FIG. 13, the heating circuit 1300 comprises at least one heating electrode 1301, a constant voltage source 1303, and a driving circuit 1305. The heating electrode 1301 may be the above-mentioned electrode of the auxiliary layer AL. The constant voltage source 1303 is configured to provide a constant voltage. The driving circuit 1305 is configured to generate a driving current Ih to the heating electrode 1301 according to the constant voltage.

In one embodiment, the driving circuit 1305 does not turn on and turn off a switch to generate the driving current. For example, the driving circuit 1305 may adjust a resistance of a variable resistor or changes a gain of an amplifier to change the current value of the driving current Ih. For example, as shown in FIG. 13, the driving circuit 1305 comprises an amplifier 1307 and a variable resistor 1309. The driving circuit 1305 may adjust a resistance of the variable resistor 1309 or changes a gain of the amplifier 1307, to change a current value of the driving current Ih. By this way, the noise caused by turning on/turning off of the switch can be reduced. Please note, the structures of the amplifier and the variable resistor are not limited to which shown in FIG. 13.

In view of above-mentioned embodiments, the touch sensing device can fit the size or the shape of the steering wheel more easily, since the sensor layer is provided to the flexible material layer. Additionally, the noise generated by the heating circuit can be reduced since a driving circuit of the heating circuit does not turn on and turn off a switch to generate the driving current.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch sensing system, comprising:
   a frame work;
   an auxiliary layer, surrounding the frame work;
   a capacitive touch sensor layer, surrounding the auxiliary layer;
   a flexible material layer, located between the capacitive touch sensor layer and the auxiliary layer, and surrounding the auxiliary layer; and
   a flattening material layer, located between the capacitive touch sensor layer and the flexible material layer or located between the auxiliary layer and the flexible material layer, wherein the flattening material flattens the flexible material layer;
   wherein the capacitive touch sensor layer is above the flexible material layer when the auxiliary layer is below the flexible material layer;
   wherein the capacitive touch sensor layer comprises at least one first driving electrode and at least one first sensing electrode;
   wherein the auxiliary layer comprises at least one electrode.

2. The touch sensing system of claim 1, wherein the auxiliary layer further comprises a ground layer or a heating layer.

3. The touch sensing system of claim 1, wherein the flattening material layer is made from Polyurethane.

4. The touch sensing system of claim 1, further comprising:
   a touch sensing IC, coupled to the first driving electrode and the first sensing electrode;
   a substrate, located between the touch sensing IC and the flexible material layer; and
   at least one conjunction component, passing through the substrate and configured to fasten the substrate to the flexible material layer or the capacitive touch sensor layer.

5. The touch sensing system of claim 4, wherein the substrate is one of a FPC (flexure circuit board) or a golden finger PCB.

6. The touch sensing system of claim 1, further comprising:
   a touch sensing IC, coupled to the first driving electrode and the first sensing electrode, welded to face a first side of the flexible material layer;
   a supporting layer, configured to support the touch sensing IC and provided to face a second side of the flexible material layer.

7. The touch sensing system of claim 1, wherein the auxiliary layer comprises a heating layer comprising a heating circuit, wherein the heating circuit comprises:
   at least one heating electrode;
   a constant voltage source, configured to generate a constant voltage; and
   a driving circuit, configured to generate a driving current to the heating electrode according to the constant voltage.

8. The touch sensing system of claim 7, wherein the driving circuit does not turn on and turn off a switch to generate the driving current.

9. A multi sensor device, comprising:
   a frame work;
   a first sensor layer, surrounding the frame work;
   a second sensor layer, surrounding the first sensor layer;
   a flexible material layer, located between the first sensor layer and the second sensor layer, and surrounding the first sensor layer; and
   a flattening material layer, located between the second sensor layer and the flexible material layer or located between the first sensor layer and the flexible material layer, wherein the flattening material layer flattens the flexible material layer;
   wherein the second sensor layer is above the flexible material layer when the first sensor layer is below the flexible material layer;
   wherein the first sensor layer has at least one first driving electrode and at least one first sensing electrode;
   wherein the second sensor layer comprises at least one second driving electrode and at least one second sensing electrode.

10. The multi sensor device of claim 9, wherein the flattening material layer is made from Polyurethane.

11. The multi sensor device of claim 9, further comprising:
    a touch sensing IC, coupled to the first driving electrode and the first sensing electrode;
    a substrate, located between the touch sensing IC and the flexible material layer; and
    at least one conjunction component, passing through the substrate and configured to fasten the substrate to the flexible material layer or the first sensor layer.

12. The multi sensor device of claim 11, wherein the substrate is one of a FPC (flexure circuit board) or a golden finger PCB.

13. The multi sensor device of claim 9, further comprising:
    a touch sensing IC, coupled to the first driving electrode and the first sensing electrode, welded to face a first side of the flexible material layer;
    a supporting layer, configured to support the touch sensing IC and provided to face a second side of the flexible material layer.

14. The multi sensor device of claim 9, wherein the first sensor layer comprises a heating layer comprising a heating circuit, wherein the heating circuit comprises:
    at least one heating electrode;
    a constant voltage source, configured to generate a constant voltage; and
    a driving circuit, configured to generate a driving current to the heating electrode according to the constant voltage.

15. The multi sensor device of claim 14, wherein the driving circuit does not turn on and turn off a switch to generate the driving current.

16. A vehicle control device, comprising:
    a frame work;
    a heating layer, surrounding the frame work;
    a first layer, surrounding the heating layer;

a flexible material layer, located between the heating layer and the first layer, and surrounding the heating layer; and a flattening material layer, located between the first layer and flexible material layer or between the heating layer and the flexible material layer, wherein the flattening material layer fills at least one aperture or at least one crack of the flexible material layer;

wherein the first layer is above the flexible material layer when the heating layer is below the flexible material layer;

wherein the first layer comprises at least one first electrode;

wherein the heating layer has at least one heating electrode.

17. The vehicle control device of claim 16, wherein the heating layer comprises a heating circuit comprising:

a constant voltage source, configured to generate a constant voltage; and a driving circuit, configured to generate a driving current to the heating electrode according to the constant voltage.

18. The multi sensor device of claim 17, wherein the driving circuit does not turn on and turn off a switch to generate the driving current.

* * * * *